(No Model.) 4 Sheets—Sheet 1.
A. T. BROWN.
BREECH LOADING FIRE ARM.
No. 367,089. Patented July 26, 1887.
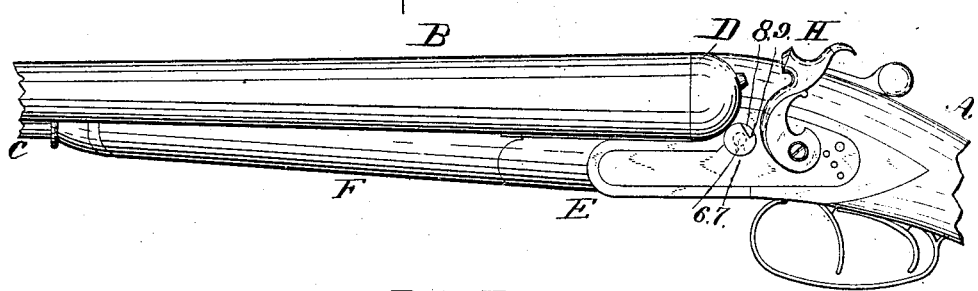
FIG-1-
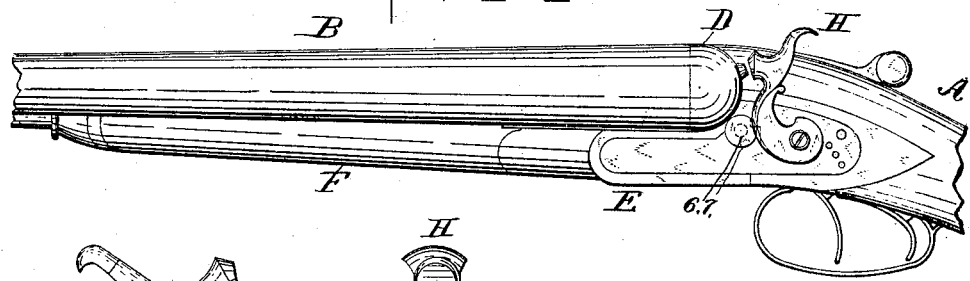
FIG-2-
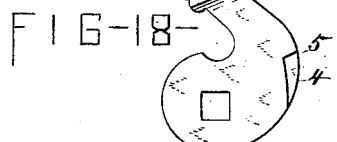
FIG-18- FIG-19-
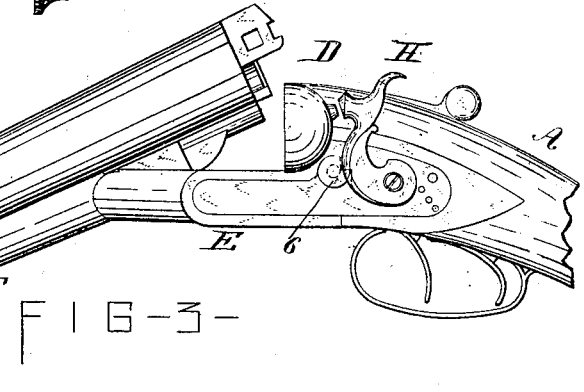
FIG-3-
ATTEST— INVENTOR—

(No Model.) 4 Sheets—Sheet 2.
A. T. BROWN.
BREECH LOADING FIRE ARM.
No. 367,089. Patented July 26, 1887.
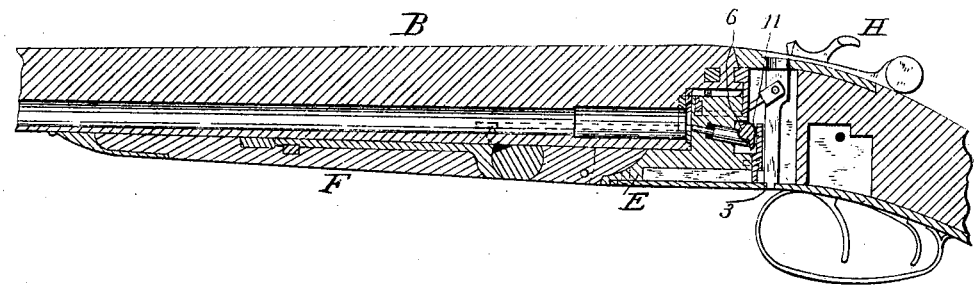
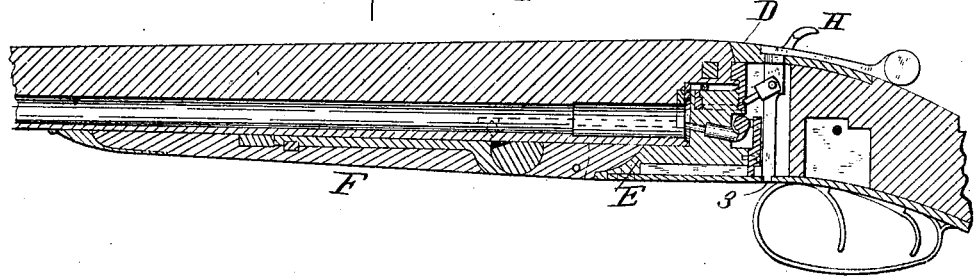
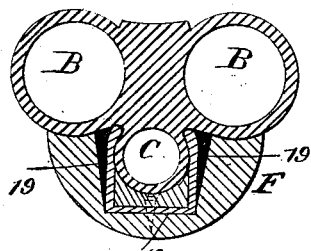
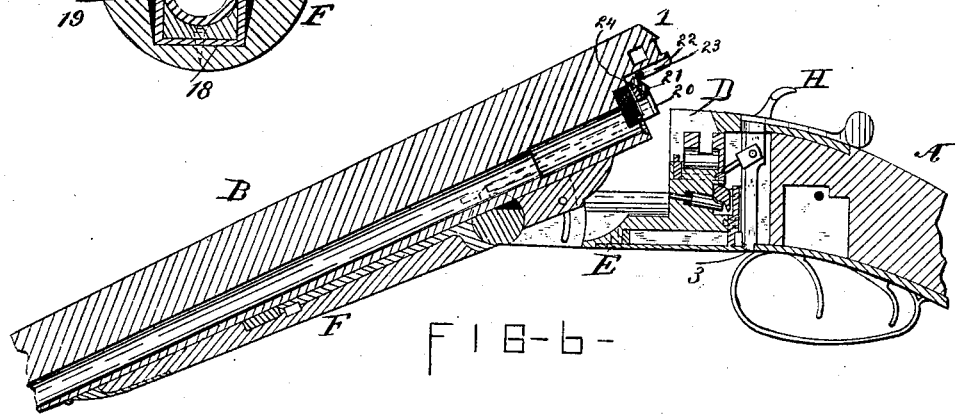
ATTEST—  
INVENTOR—  
Alex T. Brown (No Model.) 4 Sheets—Sheet 3.
A. T. BROWN.
BREECH LOADING FIRE ARM.
No. 367,089. Patented July 26, 1887.
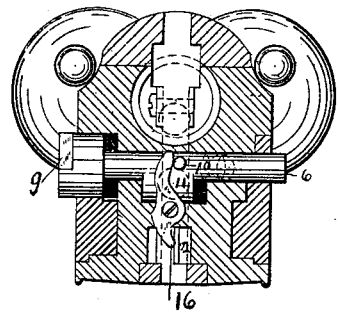
FIG-8-
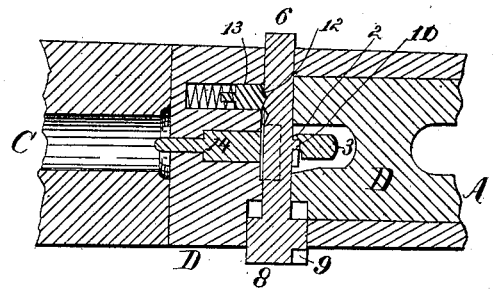
FIG-10-
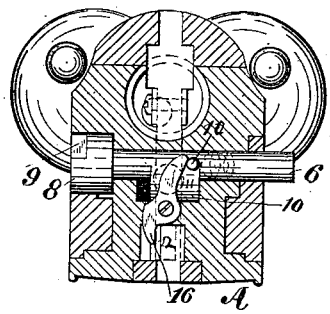
FIG-9-
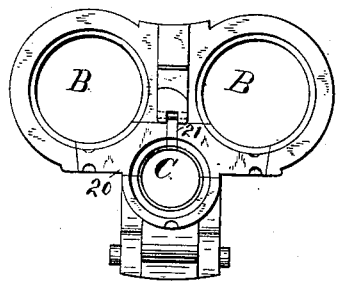
FIG-11-
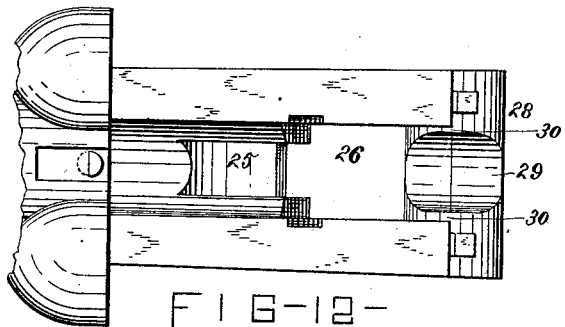
FIG-12-
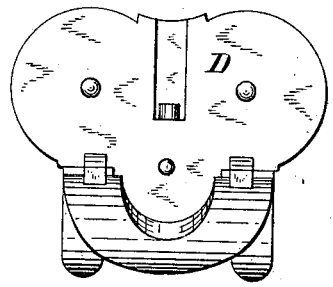
FIG-13-
ATTEST—
INVENTOR—
Alex T. Brown (No Model.) 4 Sheets—Sheet 4.
A. T. BROWN.
BREECH LOADING FIRE ARM.
No. 367,089. Patented July 26, 1887.
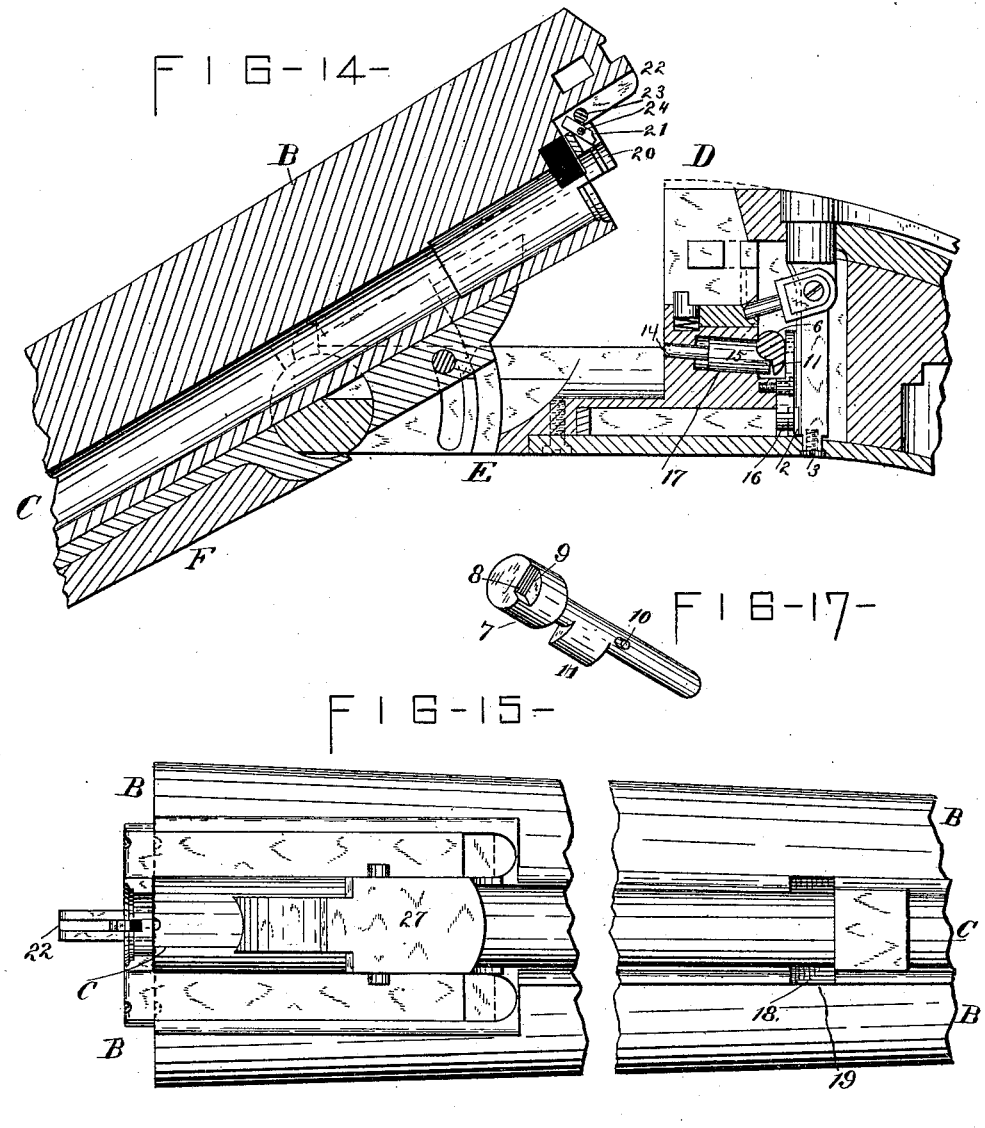
ATTEST-
INVENTOR

UNITED STATES PATENT OFFICE.

ALEXANDER T. BROWN, OF SYRACUSE, NEW YORK.

BREECH-LOADING FIRE-ARM.

SPECIFICATION forming part of Letters Patent No. 367,089, dated July 26, 1887.

Application filed October 8, 1886. Serial No. 215,689. (No model.)

*To all whom it may concern:*

Be it known that I, ALEXANDER T. BROWN, of Syracuse, county of Onondaga, in the State of New York, a citizen of the United States, have invented certain new and useful Improvements in Breech-Loading Fire-Arms, of which the following is a specification, reference being had to the accompanying drawings.

In the accompanying drawings, Figure 1 represents a side elevation of the gun closed, with the firing-pin of the third barrel in position to be operated by the hammer; Fig. 2, a like view thereof, with the third barrel discharged; Fig. 3, a like view thereof, with the third barrel discharged and the gun broken down; Fig. 4, a longitudinal vertical section of Fig. 1. Fig. 5 is a like view of Fig. 2; Fig. 6, a like view of Fig. 3; Fig. 7, a transverse section of the barrels; Fig. 8, a transverse section of the breech-block in front of the hammers, showing third-barrel firing-pin in position for firing; Fig. 9, a like view showing this firing-pin out of position; Fig. 10, a longitudinal section of the barrel and breech on the line of the center of the third barrel; Fig. 11, a rear elevation of the barrel removed from the stock; Fig. 12, a top plan view of breech block and frame; Fig. 13, a front elevation of breech block and frame; Fig. 14, a vertical longitudinal section (enlarged) of the gun broken down; Fig. 15, a bottom plan view of the barrels; Fig. 16, a plan view of the inner face of the fore-end, showing the fore-end fastening; Fig. 17, a detail of the third-barrel firing-pin; Fig. 18, an elevation of the hammer, showing the firing-notch in its inner face which operates the third-barrel firing-pin; Fig. 19, a front elevation of the hammer.

Like letters indicate like parts wherever they occur.

My invention relates more especially to three-barreled guns, although some of its distinctive features are applicable to other styles of breech-loading fire-arms. These distinctive features relate to the following points, viz: first, the firing mechanism; second, the fore-end fastening; third, the shell-ejecting mechanism. There are also other special features of construction and operation, as will be hereinafter fully described, and specifically set forth in the claims annexed.

The objects of my invention are to increase the durability and efficiency of the fire-arm, as well as the ease of manipulation. It is constructed as follows:

A is the stock.

B B are the shot-barrels, having the rifle-barrel C attached thereto and beneath and between them.

D is the breech-block, mortised to receive the extension-rib 1, and, in general, the whole mechanism for locking the barrels by a rotary lock engaging with the mortises in the extension is the same as has been previously the subject of Letters Patent granted to me, with one single exception—viz., the addition of the forwardly-projecting stud 2 near the bottom of the action-post 3 and in the front side thereof, and therefore I will not enter into a detailed description of the barrel-locking mechanism.

E is the frame.

F is the fore-end.

H H are the hammers, which are of ordinary construction, with the exception that in the front inner edge of the left-hand one I cut the groove 4 at about the point shown in Fig. 18, extending upward in a nearly-vertical line, and thence turning by substantially a right angle out to the edge, thus forming the shoulder 5. This groove 4, with the shoulder 5, is the first element of the firing mechanism of the rifle-barrel. The second element of this mechanism consists of the firing-shaft 6, which is inserted transversely across and through the breech a little forward of the action-post 3. This firing-shaft consists of a rod of metal provided at one end with a cylindrical head, 7, having in its outer edge a groove, 8, shouldered at 9, a central stud, 10, projecting backward and horizontally, and between the head and stud a downward lug, 11, having a flat front face, all substantially as shown in Fig. 17; and in Fig. 10 I show notches 12 in the edge of this shaft, and a spring-pin, 13, inserted into the breech, the point of which engages with these notches, and this pin and the notches operate to hold the shaft either in or out of gear with reference to the firing-pin 14 of the rifle-barrel. This firing-pin is constructed with a head and forward point, and is inserted into the breech at about the point shown in the drawings. The rear end of this head is cut away on the upper edge, leaving a shoulder, 15. This firing-pin constitutes the third element of the rifle-firing mechanism. This mechanism operates as follows: When the firing-shaft is in the position shown in Fig. 8, the lug 11 is in engagement with the shoulder 15 of the firing-pin, and then when the left-hand trigger is pulled that hammer is released and the shoulder 5 on the hammer strikes against the shoulder 9 in the head of the firing-shaft and partially rotates the shaft. When this rotation begins, it throws the lug 11 forward, and this drives the firing-pin forward quickly against the cap of the rifle-shell. Then when the gun is opened the rotation of the action-post throws the stud 2 against the lower end of the pivoted shifter 16, mounted upon the back face of the breech, and its upper end, encountering the stud 10 upon the firing-shaft, throws this shaft over toward the right and into the position shown in Fig. 9, practically disengaging the lug 11 from the firing-pin and leaving the left-hand hammer free to strike the shot-barrel firing-pin 17 on that side, the head of the firing-shaft being drawn back out of the way, and the spring-pin 13 then engages with the inner notch, 12. In this position the rifle-barrel cannot be fired until the lug 11 is again thrown into engagement with the rifle firing pin, and this re-engagement is effected by pressing the finger against the projecting end of the firing-shaft upon the right and pushing the shaft over to the left until they are again in the position shown in Fig. 8, and so long as the parts are in the position shown in Fig. 9 the rotation of the action-post does not affect the shifter 16, because the stud 2 does not touch it or move it.

The second feature (the fore-end fastening) is constructed as follows, (see Figs. 7 and 16:) At the proper point in the fore-end the rifle-barrel slot therein is enlarged and the spring-clasp 18 is secured therein. This spring-clasp consists of a body provided with arms 19, bent about as shown, and when these are forced and sprung over the periphery of the rifle-barrel they clasp it and hold the fore-end in place. The remainder of the fore-end is of ordinary construction.

*Shell-ejecting mechanism.*—This mechanism consists of an extractor, 20, provided with an ejector, 21, operating in conjunction with the extractor. The extractor consists of a body, in this instance provided with three faces, fitting a portion of the rims of the respective shells, the lower and central one relating to the rifle-shell. This extractor-body is mounted upon two rods, one on each side of the rifle-barrel, extending forward to the hinge between the fore-end and the frame in the ordinary manner. In the center of this body, in its outer face and extending upward from the rifle shell face, I cut a groove, in which my ejector fits loosely. This groove also extends upward from the extractor in the rear end of the barrels and opens into a longitudinal channel, 22, cut in the bottom of the extension-rib, across which channel I place the pin 23. The ejector is pivoted at 24 in the extractor and its upper end extends upward into the channel 22 forward of the pin 23. The lower end of this ejector is provided with a lip of the same form as the edge of the extractor adjacent thereto. This operates as follows: As the gun is broken down the extractor starts out, carrying the shells of all three barrels with it, and all of the shells move in like degree until just before the stroke of the extractor is finished the upper end of the ejector encounters the pin 23 and the ejector is tilted, the lower end carrying the rifle-shell head out beyond and away from the extractor until its head is farther out than the heads of the shot-shells. This makes it more convenient to remove the rifle-shell with the fingers. I can also adapt this same principle to a double gun, throwing both shells out beyond the stroke of the extractor, using an ejector for each barrel, or using one with a central body and a side arm for each barrel.

The next novel feature of my invention relates to the construction of the frame, the hinge-pin, and the lug under the barrels, which enters the frame. In this construction the mortise adjacent to the breech-face and forward nearly to the check-hook is of ordinary size—say three-eighths of an inch, as at 25—this portion not extending through the frame. Forward of this portion I widen out the mortise, for the whole length of that part which does cut through the frame clear out to the front of the frame, as at 26, say to a width of three-fourths of an inch. This enables me to enlarge the lug 27 as to that part which fits the mortise 26, giving a stiffer support for the barrels in their connection by the lug to the frame. This enlargement of the lug-mortise in the frame also enables me to use a heavier hinge-pin, 28, at least as to its diameter. This hinge-pin is centrally between the arms of the frame provided with a transverse circular slot, 29, to receive the rifle-barrel. This slot extends out toward the arms of the frame, but not quite to them, leaving the shoulders 30 to support the barrels.

The remainder of this fire-arm is of ordinary construction, and I do not consider needs a specific description.

What I claim as my invention, and desire to secure by Letters Patent, is—

1. In a three-barreled gun, the rifle-firing mechanism consisting of a hammer provided with a shouldered recess in its edge, a firing-shaft extending transversely of the frame and provided with a downward lug, and a head having also a shouldered recess, and the firing-pin in line of engagement with said shaft, constructed and operating together substantially as described.

2. In a fire-arm, the releasing mechanism consisting of the action-post provided with a stud, the pivoted shifter engaged thereby, and the stud upon the firing-shaft on which said shifter bears, all combined, constructed, and operating together substantially as shown and described.

3. In a breech-loading fire-arm, the combination of a firing-pin, a firing-shaft mounted in the frame to have rotary movement, and having a bearing on said pin, and a hammer in position to actuate said shaft, substantially as described.

4. In a breech-loading fire-arm, the combination of a firing-pin, a firing-shaft having a projection in position to bear on said pin, a hammer, and mechanism, substantially as described, by which said shaft may be shifted to throw it into or out of engagement with the hammer, substantially as described.

5. In combination with the firing-pin and hammer of a breech-loading gun, a firing-shaft mounted in the frame to have a movement into or out of operative engagement with said pin and hammer, and stops on said shaft to limit its movement, substantially as described.

6. The combination, in a breech-loading gun, of a longitudinally-moving extractor, an ejector pivoted in the extractor, and a stop in the line of movement of one end of the ejector, whereby the backward movement of the extractor actuates the ejector, substantially as described.

7. In a breech-loading fire-arm, a frame provided with a mortise and a mortise enlargement, in combination with a barrel-lug fitting said mortise and enlargement, substantially as shown and described.

8. In a breakdown gun, a frame having central mortise, a transverse pin extending across the frame, said pin being grooved across its upper face and having shoulders adjacent to the groove projecting slightly beyond the sides of the frame, in combination with a pair of barrels pivoted to break down on the stock, substantially as described.

9. In combination with a pair of gun-barrels secured together side by side and having a longitudinal rib under the same, a fore-end stock having a longitudinal groove in its upper face, and a pair of spring-arms in said groove, having sufficient play therein to clasp and unclasp the rib on the barrels, substantially as described.

In witness whereof I have hereunto set my hand this 29th day of September, 1886.

ALEX. T. BROWN.

In presence of—
C. W. SMITH,
L. P. SMITH.